United States Patent [19]
Katsuragi et al.

[11] Patent Number: 4,559,565
[45] Date of Patent: Dec. 17, 1985

[54] THERMOSENSITIVE RECORDING SYSTEM

[75] Inventors: Shigeru Katsuragi, Hiratsuka; Kunio Hakkaku; Mutsuo Ogawa, both of Yokohama, all of Japan

[73] Assignee: Ricoh Company, Ltd., Tokyo, Japan

[21] Appl. No.: 557,374

[22] Filed: Dec. 1, 1983

Related U.S. Application Data

[63] Continuation-in-part of Ser. No. 279,544, Jul. 1, 1981, abandoned.

[30] Foreign Application Priority Data

Jul. 1, 1980 [JP] Japan ................................. 55-88483

[51] Int. Cl.⁴ .............................................. H04N 1/22
[52] U.S. Cl. .................................. 358/296; 346/76 PH
[58] Field of Search ................. 346/76 PH, 151, 153.1, 346/162; 358/296, 297, 300; 400/120

[56] References Cited

U.S. PATENT DOCUMENTS 3,577,137 5/1971 Brennan, Jr. ................... 346/76 PH
3,874,493 4/1975 Boyd ............................... 346/76 PH

FOREIGN PATENT DOCUMENTS

| 2457771 | 1/1981 | France | 346/76 PH |
| 53-113556 | 10/1978 | Japan | 346/76 PH |
| 54-41650 | 11/1979 | Japan | 346/76 PH |
| 55-38746 | 3/1980 | Japan | 358/296 |
| 55-51574 | 4/1980 | Japan | 346/76 PH |

*Primary Examiner*—Donald McElheny, Jr.
*Attorney, Agent, or Firm*—Oblon, Fisher, Spivak, McClelland & Maier

[57] ABSTRACT

A thermosensitive recording system for use in the reception apparatus of a facsimile apparatus or the like, which is capable of reducing the generation of heat in a heat-emitting recording head when the temperature of the recording head is elevated beyond a predetermined temperature, by skipping a predetermined number of scanning lines during the recording operation, whereby excessive temperature elevation is prevented and continuous thermosensitive recording operation is made possible.

5 Claims, 6 Drawing Figures

THERMOSENSITIVE RECORDING SYSTEM

This is a continuation-in-part of application Ser. No. 279,544, filed July 1, 1981, now abandoned.

BACKGROUND OF THE INVENTION

The present invention relates to a thermosensitive recording system capable of preventing excessive temperature elevation of its heat-emitting recording head in operation.

In a conventional thermosensitive recording system, for instance, in a conventional signal-reception apparatus of a facsimile apparatus, thermosensitive recording sheets capable of forming images upon application of heat thereto, are employed for recording received information, and images are formed thereon by a heat-emitting recording head.

In the signal-reception apparatus, one group of image signals, for instance, black image signals, are recorded on the thermosensitive recording sheets by applying heat thereto through the heat-emitting recording head. Therefore, the greater the quantity of image signals recorded by the heat-emitting recording head, the greater the quantity of heat generated per unit time by the heat emitting recording head. Therefore, when many black image signals are contained in the information recorded, it may occur, in the extreme case, that the temperature of the recording head is so elevated that the whole surface of the recording sheet is colored by the heat generated by the recording head. Or, the resistors for generating heat in the recording head could be damaged, resulting in complete failure in recording.

In order to avoid such dangers, in the conventional thermosensitive recording system, it is necessary to stop the system from time to time depending upon the quantity of the image signals to be reproduced by the heat-emitting head. Yet, in the conventional thermosensitive recording system, if the operator is careless in such operation, damaging the recording head is all too likely.

In order to eliminate the above-mentioned shortcomings of the conventional thermosensitive recording system, there has been proposed a method of preventing excessive elevation of the overall temperature of the heat-emitting recording head by reducing the pulse width of the signals which cause elevation of the temperature of the recording head, for instance, the signals for the above-mentioned black images, or by decreasing the power necessary for such signals. This method, however, has a shortcoming in that images with high contrast cannot be obtained when the temperature of the recording head is comparatively low and the quantity of heat generated by the recording head is small.

SUMMARY OF THE INVENTION

It is therefore an object of the present invention to provide a thermosensitive recording system capable of preventing excessive elevation of the temperature of a heat-emitting recording head thereof, while maintaining maximum contrast in the images reproduced.

In order to accomplish this object, in the present invention, image signals to be reproduced are partly skipped in the course of the reproduction of the images by the recording head, depending upon the temperature of the recording head, whereby excess elevation of the temperature of the recording head in operation can be prevented, and the shortcomings of the conventional thermosensitive recording systems, such as continuation of recording becoming impossible due to excess elevation of the temperature of the recording head or the head being damaged by the excessive elevation of the temperature thereof, are successfully eliminated.

BRIEF DESCRIPTION OF THE DRAWINGS

In the drawings,

FIG. 4($b$) is a block diagram of another example of a counter circuit for use in the present invention.

DETAILED DESCRIPTION OF THE PREFERRED EMBODIMENT

Figure 1:
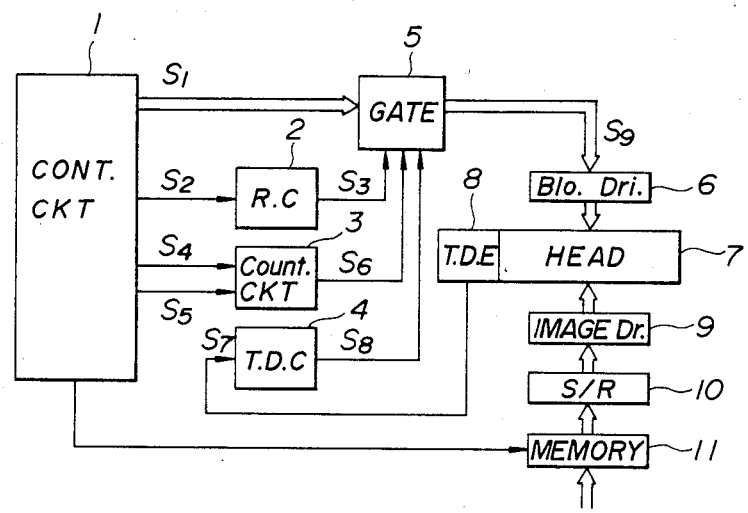
FIG. 1 is a block diagram of an embodiment of a thermosensitive recording system according to the present invention.

Referring to FIG. 1, there is shown a block diagram of an embodiment of a thermosensitive recording system according to the present invention. In the figure, reference numeral 1 represents a control circuit; reference numeral 2, a recording-signal-application-time-setting circuit; reference numeral 3, a counter circuit; reference numeral 4, a temperature-detection circuit; reference numeral 5, a gate circuit; reference numeral 6, a block driver; reference numeral 7, a heat-emitting recording head (hereinafter referred to as the head); reference numeral 8, a temperature-detection element attached to a base plate for the head 7; reference numeral 9, an image-signal driver; reference numeral 10, a shift register; and reference numeral 11, a memory.

Figure 2:
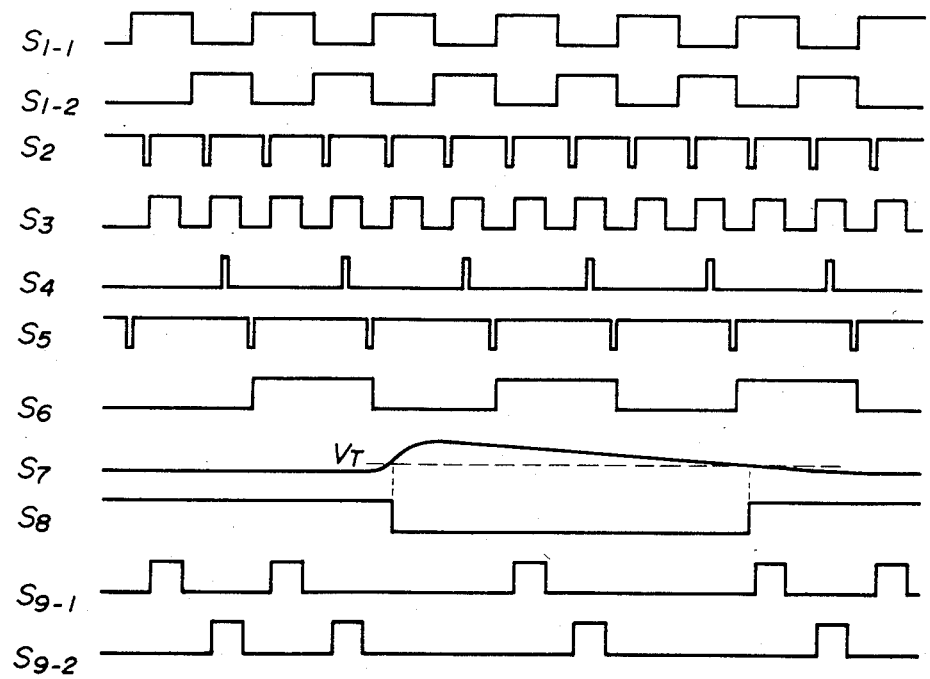
FIG. 2 is a timing chart in explanation of the operation of the thermosensitive recording system shown in FIG. 1.

Referring to the timing chart shown in FIG. 2, the operation of an embodiment of a thermosensitive recording system according to the present invention will now be explained.

The control circuit 1 controls the memory 11 so as to shift the image signals from the memory 11 to the shift register 10. By the shifted image signals, the image-signal driver 9 is actuated.

At the same time, the control circuit 1 applies a write-in command signal $S_2$ to the recording-signal-application-time-setting circuit 2, causing the circuit 2 to generate a recording signal $S_3$, which recording signal $S_3$ is applied to the gate circuit 5, opening the gate circuit 5 and causing the gate circuit 5 to generate a block signal $S_9$ therefrom corresponding to a block address $S_1$ generated from the control circuit 1. The block signal $S_9$ is applied to the block driver 6, so that the head 7 is driven block by block and the thermosensitive recording of the image signals is conducted.

Since the above-described block-driving type thermosensitive recording system is well known, its operation mechanism will now be explained only briefly.

The heat-emitting elements of the head 7 are divided into a plurality of blocks, for instance, two blocks (in practice, those elements are divided into more than two blocks), and their addresses are designated as addresses $S_{1-1}$ and $S_{1-2}$. These addresses are gated by the recording signal $S_3$, converting the addresses $S_{1-1}$ and $S_{1-2}$ to block signals S$_{9-1}$ and S$_{9-2}$ for successive thermosensitive recording. When the recording is performed, the write-in command signal S$_2$ is converted to the recording signal S$_3$. This conversion is done to provide the period of time required for thermosensitive recording.

The above-mentioned operation is the same as that of the conventional thermonsensitive recording system. In the present invention, however, when the operation is performed, a voltage S$_7$ indicating the temperature of the head 7 is applied from the temperature-detection element 8 attached to the head 7 to the temperature-detection circuit 4. When the voltage S$_7$ is below a predetermined threshold value V$_T$, a temperature indication signal "H" is applied to the gate circuit 5, while when the voltage S$_7$ exceeds the threshold value V$_T$, another temperature indication signal "L" is applied to the gate circuit 5.

Further, a sheet feeding command signal S$_4$ and a recording synchronization signal S$_5$ are applied to the counter circuit 3, and a signal S$_6$, which is obtained by counting down either the sheet-feeding command signal S$_4$ or the recording synchronization signal S$_5$, is applied as a write-performance signal to the gate circuit 5.

Figure 5:
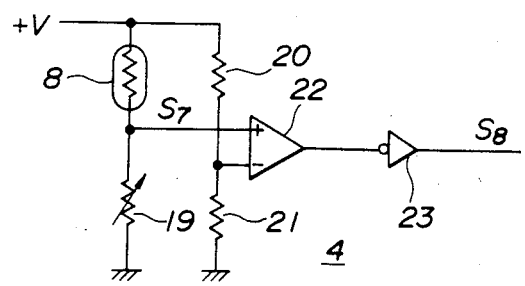
FIG. 5 is a circuit diagram of an example of a temperature-detection circuit for use in the present invention.

Referring to FIG. 5, there is shown an example of the gate circuit 5. In the figure, reference numeral 12 represents an OR gate, and reference numerals 13 to 15 represent AND gates.

The write-performance signal S$_6$ and the temperature signal S$_8$ are synthesized in the OR gate 12. The synthesized signal and the recording signal S$_3$ are applied to the AND gate 13. By the output of the AND gate 13, the block addresses S$_{1-1}$ and S$_{1-2}$ are gated, so that the block signals S$_{9-1}$ and S$_{9-2}$ are obtained.

Figure 4:
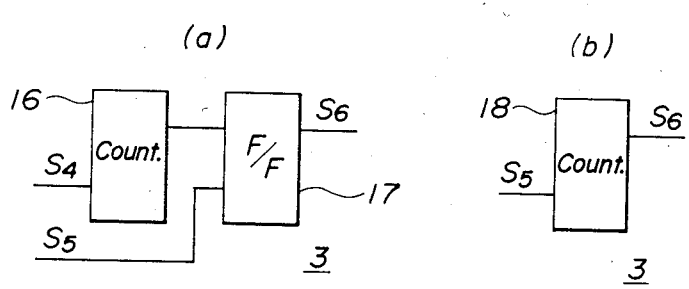
FIG. 4($a$) is a block diagram of an example of a counter circuit for use in the present invention.

The counter circuit 3 is constructed as shown in FIG. 4(a) or FIG. 4(b). In those figures, reference numerals 16 and 18 each represent a binary counter and reference numeral 17 represents a flip-flop.

In the example of the counter circuit 3 as shown in FIG. 4(a), the sheet-feeding command signal S$_4$ produced from the control circuit 1 is applied to the binary counter 16 which employs the sheet feeding command signal S$_4$ as count input. The output from the binary counter 16 is applied to the flip-flop 17 and, at the same time, the recording synchronization signal S$_5$ is applied to the flip-flop 17 for recording synchronization, and the output of the flip-flop 17 is used as the signal S$_6$.

In the example of the counter circuit 3 as shown in FIG. 4(b), the recording synchronization signal S$_5$ is applied to the binary counter 18 and the count output from the binary counter 18 is used as the write-performance signal S$_6$.

The counters 16 and 18 are not limited to binary counters, but can be n-adic counters.

Referring to FIG. 5, there is shown a circuit diagram of an example of a temperature-detection circuit for use in the present invention. In the figure, reference numeral 8 represents a temperature-detection element. In this example, a thermistor is used as the temperature-detection element. Reference numeral 19 represents a variable resistor for temperature adjustment; reference numerals 20 and 21, resistors for setting a comparative voltage; reference numeral 22, a comparator; and reference numeral 23, an inverter.

Referring back to FIG. 1 and FIG. 2, when the temperature of the head 7 continuously increases for some reason in recording operation, the following steps are taken in the present invention.

As the temperature of the head 7 increases, the voltage S$_7$ applied from the temperature-detection element 8 to the temperature-detection circuit 4 increases, finally up to its threshold value T$_V$ at the end. As a matter of course, the threshold value T$_V$ can be set as desired by the variable resistor 19.

Figure 3:
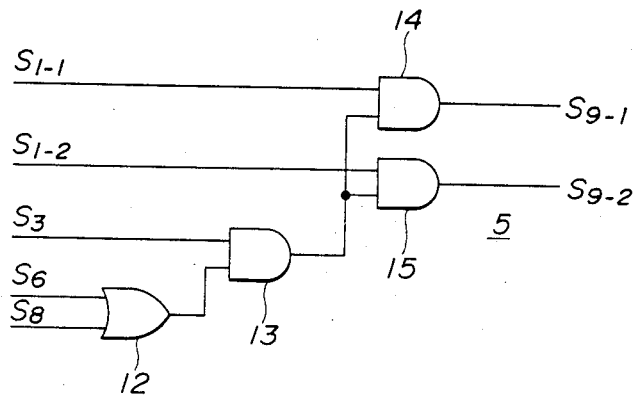
FIG. 3 is a block diagram of an example of a gate circuit for use in the present invention.

When the voltage S$_7$ amounts to the threshold value T$_V$, the temperature signal S$_8$ is changed from "H" to "L." As a result, the output of the OR gate 12 (refer to FIG. 3), which has been at "H" so far, is changed to the write performance signal S$_6$ which is output from the counter circuit 3. As can be seen from FIG. 2, since the write performance signal S$_6$ changes its states "H" and "L" alternately when the sheet-feeding command signal S$_4$ or the recording synchronization signal S$_5$ is generated one time each, the recording signal S$_3$ is output from the AND gate 13 one time when the sheet-feeding command signal S$_4$ or the recording synchronization signal S$_5$ is generated two times. As a result, the block signals S$_{9-1}$ and S$_{9-2}$ are each applied one time to the block driver 6 when the sheet feeding command signal S$_4$ or the recording synchronization signal S$_5$ is generated two times.

In this embodiment, whenever the sheet feeding command signal S$_4$ is generated, subscanning is performed, while whenever the recording synchronization signal S$_5$ is generated, recording for one scanning line is performed. Therefore, when the temperature of the head amounts to the predetermined threshold value T$_V$, the recording is performed at every other scanning line, so that the recording density in the subscanning direction is reduced to half; i.e. the recording in the subscanning direction skips alternate scanning lines in the recording operation.

As a result, the quantity of heat generated in the head 7 per unit of time by the recording image signals is reduced to half and, therefore, excessive elevation of the temperature of the head 7 can be prevented.

In the example of the counter circuit 3 as shown in FIG. 4(a), the write performance signal S$_6$ is obtained by counting the sheet-feeding command signal S$_4$, while in the example of the counter circuit 3 as shown in FIG. 4(b), the write performance signal S$_6$ is obtained by counting the recording synchronization signal S$_5$.

The differences between the two examples in terms of the advantages are as follows:

In the case of the counter circuit 3 as shown in FIG. 4(a), when the temperature of the head 7 is excessively elevated, the recording operation is performed at intervals of a predetermined number of scanning lines.

On the other hand, in the case of the counter circuit 3 as shown in FIG. 4(b), when it is employed in the facsimile apparatus employing a band compression transmission technique, it can increase the scanning line density in comparison with the counter circuit 3 as shown in FIG. 4(a), since when the redundancy of the image information in transmission is small, a long period of time is required for the data transmission and the sheet feeding is stopped during that period of time. In this case, however, the intervals of the recording time can be made constant.

According to the present invention, even if the temperature of the head 7 increased beyond a predetermined temperature, the recording operation can be continued although the image density in the subscanning direction is decreased to some extent.

In the above-described embodiment, the counter circuit 3 is constructed of the binary counter 16 or the binary counter 18. However, as mentioned previously, the counter circuit 3 is not limited to such binary counter, since the count number of the counter circuit 3 can be predetermined as desired and in accordance with the predetermined count number, the number of the skipped scanning lines in the subscanning direction can be set as desired when the temperature of the head 7 is elevated beyond a predetermined temperature.

Furthermore, the construction of the above-described embodiment is of a hard type, using the circuits 2 to 5 which receive signals from the control circuit 1. However, according to the present invention, since the recording processing can be done line by line in the course of scanning, the present invention can be embodied in the form of a microcomputer program using a microcomputer control apparatus in the recording system.

Figure 6:
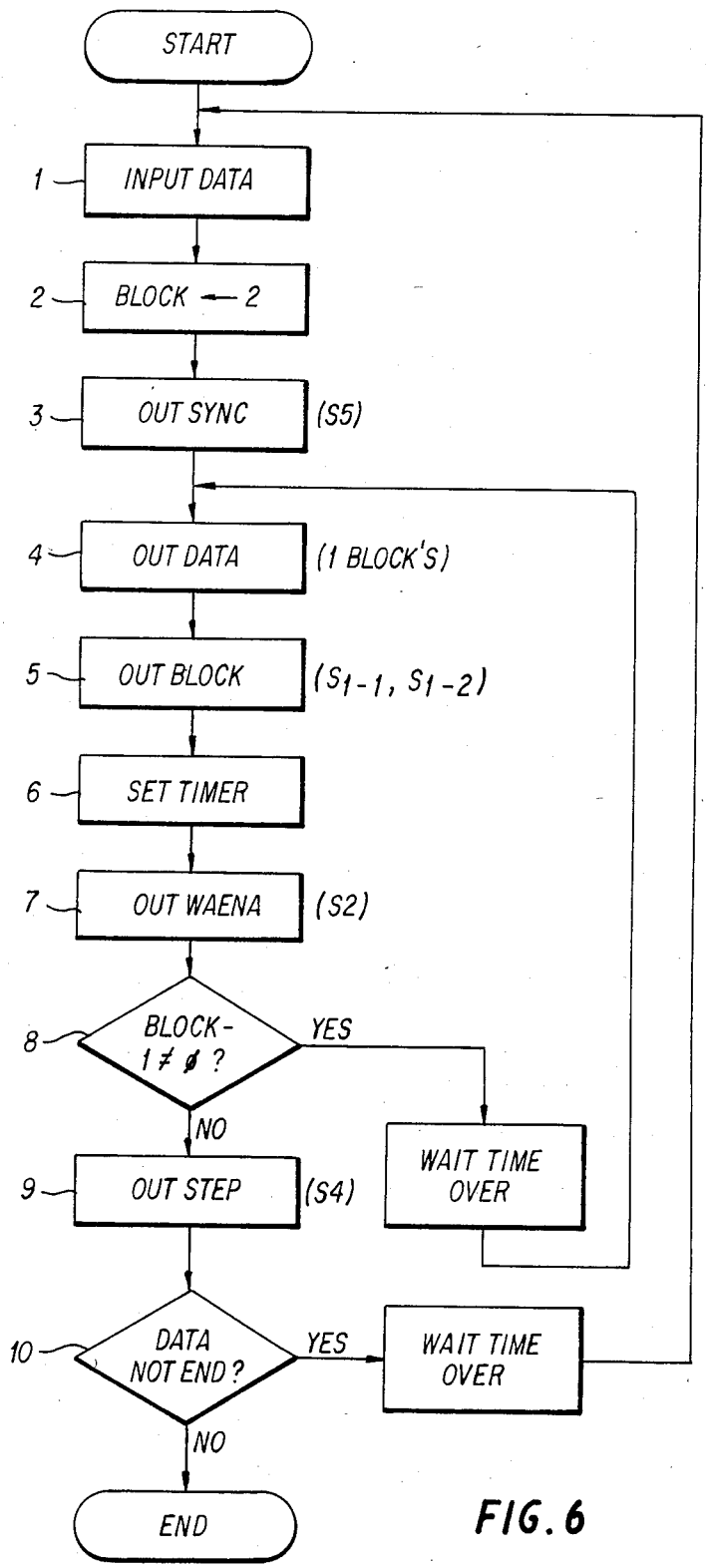
FIG. 6 is a flow chart illustrating implementation of the invention using a microcomputer.

The present invention may for example be applied to a recording system controlled by a microcomputer which makes use of an "Intel 8085" as its CPU and also includes, in combination with the "Intel 8085", a suitable ROM and RAM, and S/P and P/S converters for data processing. An example of the operation of its control circuit 1 is shown in the flow chart of FIG. 6, including the following steps:

Step 1: Data is input to the memory 11 from an unillustrated data source.

Step 2: The number of division into blocks (BLOCK NUMBER) is set at the RAM. In the above embodiment, BLOCK NUMBER=2.

Step 3: A synchronization signal $S_5$ is output.

Step 4: Data, equivalent to one block, is output from the memory 11 to the shift register 10.

Step 5: An address signal $S_1$ is output.

Step 6: A timer is set to monitor the time in the CPU.

Step 7: A write-in command signal $S_2$ is output.

Step 8: One (1) is subtracted from the BLOCK NUMBER in order to determine that the remainder has not reached zero (0). Incidentally, a reduction of the BLOCK NUMBER to zero (0) indicates that the recording of data, equivalent to a single line, has been completed.

Step 9: A sheet feeding command signal $S_4$ is output.

Step 10: It is checked whether data intput from the data source has reached a volume equivalent to a single page.

The present invention can be practiced in the above manner, using a microcomputer.

According to the present invention, excessive elevation of the temperature of the recording head in operation can be prevented, and the shortcomings of the conventional thermosensitive recording systems are successfully eliminated.

What is claimed is:

1. A thermosensitive recording system for recording serial one-dimensional image signals obtained by scanning a two-dimensional image, by a heat-emitting recording head and a thermosensitive sheet, said recording system comprising:
   temperature-detection means for detecting the temperature of said heat-emitting head; and
   recording-density-changing means for changing the recording density of the images obtained by recording said serial one-dimensional image signals in the subscanning direction, said recording density being decreased in the subscanning direction by controlling said recording-density-changing means in accordance with detection signals from the temperature-detection means as the temperature of said heat-emitting head is elevated.

2. A thermosensitive recording system as claimed in claim 1, wherein said temperature-detection means comprises a thermistor attached to a base plate of said heat-emitting recording head.

3. A thermosensitive recording system for a facsimile system which is equipped with a one-line heat-emitting head having recording elements equivalent to one line in a main scanning direction so as to make a record by shifting a recording sheet in a subscanning direction, said recording system comprising:
   temperature-detection means for detecting the temperature of said heat-emitting head; and
   recording-density-changing means for changing the recording density of images obtained by recording said serial one-dimensional image signals in the subscanning direction, said recording density being decreased in the subscanning direction by controlling said recording-density-changing means in accordance with detection signals from the temperature-detection means as the temperature of said heat-emitting head is elevated;
   wherein said recording-density-changing means comprises a recording operation skipping means which counts sheet feeding command signals and performs the recording operation with a predetermined number of scanning lines skipped at predetermined intervals only when a predetermined number of said sheet feeding command signals are produced.

4. A thermosensitive recording system as claimed in claim 3, wherein said recording-density-changing means comprises a recording operation skipping means which counts recording synchronization signals and performs recording operation at predetermined intervals, with a predetermined number of scanning lines skipped at predetermined intervals.

5. A thermosensitive recording system as claimed in claim 3 wherein, the decreasing operation of said recording density in the subscanning direction in accordance with the elevation of the temperature of said heat-emitting recording head is performed by use of a control program of a microcomputer.

* * * * *